US012567212B2

(12) United States Patent
Tang et al.

(10) Patent No.: US 12,567,212 B2
(45) Date of Patent: Mar. 3, 2026

(54) COMMUNICATION METHOD AND COMMUNICATION APPARATUS

(71) Applicant: HUAWEI TECHNOLOGIES CO., LTD., Shenzhen (CN)

(72) Inventors: Xiaowei Tang, Shenzhen (CN); Qiang Fan, Shanghai (CN); Chong Lou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/989,520

(22) Filed: Dec. 20, 2024

(65) Prior Publication Data

US 2025/0124661 A1     Apr. 17, 2025

Related U.S. Application Data

(63) Continuation of application No. PCT/CN2023/101300, filed on Jun. 20, 2023.

(30) Foreign Application Priority Data

Jun. 24, 2022   (CN) ......................... 202210729925.4

(51) Int. Cl.
*G06T 19/00* (2011.01)
*G06F 3/01* (2006.01)

(52) U.S. Cl.
CPC .............. *G06T 19/00* (2013.01); *G06F 3/012* (2013.01); *G06T 2200/16* (2013.01)

(58) Field of Classification Search
None
See application file for complete search history.

(56) References Cited

U.S. PATENT DOCUMENTS 9,491,418 B2 *  11/2016  Iversen ................... G06F 3/011
9,904,056 B2 *  2/2018  Raghoebardajal ... H04N 13/344
(Continued)

FOREIGN PATENT DOCUMENTS

CN      112703464 A     4/2021
CN      113632145 A     11/2021

OTHER PUBLICATIONS

Extended European Search Report issued in corresponding European Application No. 23826399.0, dated Sep. 8, 2025, pp. 1-9.
(Continued)

*Primary Examiner* — Vinh T Lam
(74) *Attorney, Agent, or Firm* — HAUPTMAN HAM, LLP

(57)     ABSTRACT

A communication method includes sending, by a terminal device, first indication information to a first communication device. The first indication information indicates the first communication device to render first foreground content, and the first foreground content is to-be-displayed foreground content of the terminal device. The communication information also includes receiving, by the terminal device, first information from the first communication device. The first information comprises second foreground content and second background content. The second foreground content is obtained by rendering the first foreground content. The second background content is obtained by decoding third background content. The third background content is determined based on first background content. The first background content is to-be-displayed background content of the terminal device.

20 Claims, 5 Drawing Sheets

(56) References Cited

U.S. PATENT DOCUMENTS

| | | | | |
|---|---|---|---|---|
| 10,186,087 B2 * | 1/2019 | Davis | | G06F 3/011 |
| 10,495,884 B2 * | 12/2019 | Benesh | | G02B 27/017 |
| 10,580,179 B2 * | 3/2020 | Luan | | H04N 21/4666 |
| 10,650,595 B2 * | 5/2020 | Leppänen | | G06F 3/012 |
| 10,773,162 B1 * | 9/2020 | Harris | | H04L 65/762 |
| 10,776,970 B2 * | 9/2020 | Luan | | H04N 21/4666 |
| 10,877,641 B2 * | 12/2020 | Jia | | G06N 3/08 |
| 10,962,780 B2 * | 3/2021 | Ambrus | | G06F 3/012 |
| 10,965,885 B2 * | 3/2021 | Wu | | H04N 23/64 |
| 11,310,472 B2 * | 4/2022 | Shinohara | | G06T 19/00 |
| 11,395,947 B2 * | 7/2022 | Takahashi | | G06T 19/006 |
| 11,651,752 B2 * | 5/2023 | Kammachi-Sreedhar | | |
| | | | | H04N 21/84 |
| | | | | 345/632 |
| 11,922,636 B2 * | 3/2024 | Bond | | G06T 7/194 |
| 11,994,686 B2 * | 5/2024 | Li | | G09G 5/14 |
| 11,998,819 B2 * | 6/2024 | Takahashi | | A63B 69/0002 |
| 12,120,450 B2 * | 10/2024 | Xiao | | H04N 5/91 |
| 12,175,681 B2 * | 12/2024 | Wang | | G06T 3/4038 |
| 12,386,652 B2 * | 8/2025 | Zhang | | G06F 9/4831 |
| 2012/0169923 A1 * | 7/2012 | Millar | | H04N 19/174 |
| | | | | 348/399.1 |
| 2014/0071164 A1 * | 3/2014 | Saklatvala | | G06F 3/04842 |
| | | | | 345/633 |
| 2016/0307361 A1 * | 10/2016 | Shionozaki | | G06F 3/16 |
| 2017/0115488 A1 | 4/2017 | Ambrus et al. | | |
| 2017/0150139 A1 * | 5/2017 | Lee | | H04N 13/344 |
| 2018/0041809 A1 * | 2/2018 | Chang | | H04L 65/613 |
| 2020/0265648 A1 * | 8/2020 | Thornbury | | G02B 27/0101 |
| 2022/0319016 A1 * | 10/2022 | Graber | | G06V 10/28 |
| 2023/0330541 A1 * | 10/2023 | Dong | | A63F 13/47 |
| 2024/0184506 A1 * | 6/2024 | Zhou | | G06F 3/0488 |
| 2025/0156135 A1 * | 5/2025 | Jia | | G06F 9/451 |

OTHER PUBLICATIONS

3rd Generation Partnership Project; Technical Specification Group Radio Access Network; Study on XR (Extended Reality) Evaluations for NR (Release 17). 3GPP TR 38.838 V1.0.0 (Dec. 2021). total 247 pages.

International Search Report issued in corresponding International Application No. PCT/CN2023/101300, dated Aug. 30, 2023, pp. 1-9.

* cited by examiner

500

600

(a)

(b)

(c)

COMMUNICATION METHOD AND COMMUNICATION APPARATUS

CROSS-REFERENCE TO RELATED APPLICATIONS

This application is a continuation of International Application No. PCT/CN2023/101300, filed on Jun. 20, 2023, which claims priority to Chinese Patent Application No. 202210729925.4, filed on Jun. 24, 2022. The disclosures of the aforementioned application are hereby incorporated by reference in their entireties.

TECHNICAL FIELD

Embodiments of this application relate to the communication field, and more specifically, to a communication method and a communication apparatus.

BACKGROUND

Extended reality (XR) refers to a reality and virtuality combined human-computer interactive environment generated by using a computer technology and a wearable device. The XR is proposed based on augmented reality (AR), virtual reality (VR), and mixed reality (MR). In other words, to avoid concept confusion, the XR is actually a collective term, including AR, VR, and MR. An XR service aims to use a high-speed network and a technology, for example, 360-degree imaging, to achieve an interactive immersive experience effect.

Currently, there is little research on the XR. For the XR service, how to improve actual user experience is an urgent problem to be resolved.

SUMMARY

Embodiments of this application provide a communication method and a communication apparatus, so that a terminal device can be lightweight, thereby further improving actual user experience.

According to a first aspect, a communication method is provided. The method may be performed by a terminal device, or may be performed by a chip or a circuit disposed in a terminal device. This is not limited in this application. For ease of description, the following uses an example in which the method is performed by a terminal device for description.

The method includes:

The terminal device sends first indication information to a first communication device, where the first indication information indicates the first communication device to render first foreground content, and the first foreground content is to-be-displayed foreground content of the terminal device. The terminal device receives first information from the first communication device, where the first information includes second foreground content and second background content, where the second foreground content is obtained by rendering the first foreground content, the second background content is obtained by decoding third background content, the third background content is determined based on first background content, and the first background content is to-be-displayed background content of the terminal device.

According to the method provided in this embodiment of this application, the terminal device sends the first indication information to the first communication device, where the first indication information indicates the first communication device to render the first foreground content, and the first foreground content is the to-be-displayed foreground content of the terminal device. The terminal device receives the first information from the first communication device, where the first information includes the second background content and the second foreground content. The terminal device combines the second background content and the second foreground content for display. The terminal device does not need to perform corresponding processing on the to-be-displayed foreground content and background content, and only needs to receive the background content and the foreground content that are processed by the first communication device, so that a computing requirement of the terminal device is lowered, and the terminal device is lightweight, thereby improving actual user experience.

It should be understood that, in this application, the first background content is the to-be-displayed background content of the terminal device, and the first foreground content is the to-be-displayed foreground content of the terminal device. Both the to-be-displayed background content and the to-be-displayed foreground content are to-be-displayed pictures (or referred to as to-be-displayed content, to-be-processed pictures, or to-be-processed content) of the terminal device, and are pictures or content that have not been processed by the terminal device, the first communication device, and a second communication device.

It should be noted that the first communication device in this application may be an edge computing power node (or referred to as a nearby computing power node) of the terminal device, or the first communication device may be a computing power node that provides a service for the terminal device.

It should be further noted that the first communication device may be one or more computing power nodes, or the terminal device may be one or more terminal devices. This is not limited in this application.

With reference to the first aspect, in some implementations of the first aspect, the terminal device sends user interaction information to the second communication device, where the user interaction information is used for determining the first background content.

According to the foregoing solution, after determining the user interaction information, the terminal device sends the user interaction information to the second communication device. The user interaction information is used by the second communication device to further determine the first background content.

With reference to the first aspect, in some implementations of the first aspect, the third background content is obtained by rendering and encoding the first background content by the second communication device.

According to the foregoing solution, after determining the first background content based on the user interaction information, the second communication device renders and encodes the first background content based on the first background content to obtain the third background content. The second communication device sends second indication information to the first communication device, to indicate the first communication device to decode the third background content, so that the terminal device is prevented from decoding the third background content, and complexity and a computing requirement of the terminal device are lowered.

With reference to the first aspect, in some implementations of the first aspect, the third background content is obtained by the second communication device from locally cached background content based on the first background content.

According to the foregoing solution, after the second communication device determines the first background content based on the user interaction information, the second communication device queries the locally cached background content based on the first background content. The second communication device caches content with high popularity locally, facilitating reduction in latency of end-to-end data transmission and improving system performance.

With reference to the first aspect, in some implementations of the first aspect, the terminal device determines the first indication information based on the user interaction information and second information. The second information indicates a status of the first communication device. The second information includes one or more of the following: a channel state of the first communication device, a total computing resource of the first communication device, an available computing resource of the first communication device, remaining power of the first communication device, or storage space of the first communication device.

According to the foregoing solution, the terminal device determines the first indication information based on the user interaction information and the second information. The terminal device further determines the first indication information based on the status of the first communication device. For example, when the available computing resource of the first communication device is abundant, a computing requirement indicated by the first indication information sent by the terminal device to the first communication device may be high. When the remaining power of the first communication device is low, a computing requirement indicated by the first indication information sent by the terminal device to the first communication device may be small or zero. The terminal device further determines the first indication information based on the status of the first communication device, so that latency of end-to-end transmission can be reduced through distributed rendering, and rendering quality is improved, thereby improving user experience.

With reference to the first aspect, in some implementations of the first aspect, the user interaction information includes one or more of the following: a pose change of a user of the terminal device, a position change of a user of the terminal device, or a control instruction of a user of the terminal device.

It should be understood that the pose change, the position change, and the control instruction of the user of the terminal device are information about the user who uses or controls the terminal device.

According to a second aspect, a communication method is provided. The method may be performed by a first communication device, or may be performed by a chip or a circuit disposed in a first communication device. This is not limited in this application. For ease of description, an example in which the method is performed by a first communication device is used below for description.

The method includes:

The first communication device receives first indication information from a terminal device, where the first indication information indicates the first communication device to render first foreground content, and the first foreground content is to-be-displayed foreground content of the terminal device. The first communication device receives second indication information from a second communication device, where the second indication information indicates the first communication device to decode third background content, the third background content is determined based on first background content, and the first background content is to-be-displayed background content of the terminal device. The first communication device sends first information to the terminal device, where the first information includes second foreground content and second background content, where the second foreground content is obtained by rendering the first foreground content, and the second background content is obtained by decoding the third background content.

According to the method provided in this embodiment of this application, the first communication device receives the first indication information and the second indication information. The first indication information indicates the first communication device to render the first foreground content. The first foreground content is the to-be-displayed foreground content of the terminal device. The second indication information indicates the first communication device to decode the third background content. The third background content is determined by the second communication device based on the first background content. The first communication device sends the first information to the terminal device, where the first information includes the second background content and the second foreground content that are processed by the first communication device. The terminal device combines the second background content and the second foreground content for display. The terminal device does not need to perform corresponding processing on the to-be-displayed foreground content and background content, and only needs to receive the background content and the foreground content that are processed by the first communication device, so that a computing requirement of the terminal device is lowered, and the terminal device is lightweight, thereby improving actual user experience.

With reference to the second aspect, in some implementations of the second aspect, the third background content is obtained by rendering and encoding the first background content by the second communication device.

For example, when the second communication device is a cloud server, the second communication device renders and encodes the first background content to obtain the third background content.

With reference to the second aspect, in some implementations of the second aspect, the third background content is obtained by the second communication device from locally cached background content based on the first background content.

For example, when the second communication device is a core network device or an access network device, after the second communication device determines the first background content based on user interaction information, the second communication device queries the locally cached background content based on the first background content. The second communication device caches content with popularity locally, facilitating reduction in latency of end-to-end data transmission and improving system performance.

With reference to the second aspect, in some implementations of the second aspect, the first communication device sends second information. The second information indicates a status of the first communication device. The second information includes one or more of the following: a channel state of the first communication device, a total computing resource of the first communication device, a computable resource of the first communication device, remaining power of the first communication device, or storage space of the first communication device.

According to the foregoing solution, the first communication device sends the second information. The second information indicates the status of the first communication device. The terminal device further determines the first indication information based on the user interaction information and the second information, so that content rendering quality is improved, thereby improving user experience.

According to a third aspect, a communication method is provided. The method may be performed by a second communication device, or may be performed by a chip or a circuit disposed in a second communication device. This is not limited in this application. For ease of description, an example in which the method is performed by a second communication device is used below for description.

The method includes:

The second communication device receives user interaction information from a terminal device, where the user interaction information is used for determining first background content, and the first background content is to-be-displayed background content of the terminal device. The second communication device sends second indication information to a first communication device, where the second indication information indicates the first communication device to decode third background content, and the third background content is determined based on the first background content.

According to the method provided in this embodiment of this application, the second communication device determines, based on the user interaction information, the first background content to be displayed by the terminal device; and sends the second indication information to the first communication device, to indicate the first communication device to decode the third background content. The third background content is determined based on the first background content, so that the terminal device is prevented from decoding the third background content, a computing requirement of the terminal device is lowered, and the terminal device is lightweight, thereby improving actual user experience.

With reference to the third aspect, in some implementations of the third aspect, the third background content is obtained by rendering and encoding the first background content by the second communication device.

For example, when the second communication device is a cloud server, the second communication device renders and encodes the first background content to obtain the third background content.

With reference to the third aspect, in some implementations of the third aspect, the third background content is obtained by the second communication device from locally cached background content based on the first background content.

For example, when the second communication device is a core network device or an access network device, after the second communication device determines the first background content based on user interaction information, the second communication device queries the locally cached background content based on the first background content. The second communication device caches content with popularity locally, facilitating reduction in latency of end-to-end data transmission and improving system performance.

With reference to the third aspect, in some implementations of the third aspect, the second communication device sends the second indication information to the first communication device based on second information. The second information indicates a status of the first communication device. The second information includes one or more of the following: a channel state of the first communication device, a total computing resource of the first communication device, an available computing resource of the first communication device, remaining power of the first communication device, or storage space of the first communication device.

With reference to the third aspect, in some implementations of the third aspect, the second communication device sends the second indication information to the first communication device based on the second information and third information. The third information includes a bit rate identifier of the third background content.

With reference to the third aspect, in some implementations of the third aspect, the third information further includes a tile identifier of the third background content.

With reference to the third aspect, in some implementations of the third aspect, the user interaction information includes one or more of the following: a pose change of a user of the terminal device, a position change of a user of the terminal device, or a control instruction of a user of the terminal device.

According to a fourth aspect, a communication apparatus is provided. The communication apparatus includes a transceiver unit, configured to send first indication information to a first communication device, where the first indication information indicates the first communication device to render first foreground content, and the first foreground content is to-be-displayed foreground content of a terminal device. The transceiver unit is further configured to receive first information from the first communication device, where the first information includes second foreground content and second background content, where the second foreground content is obtained by rendering the first foreground content, the second background content is obtained by decoding third background content, the third background content is determined based on first background content, and the first background content is to-be-displayed background content of the terminal device.

With reference to the fourth aspect, in some implementations of the fourth aspect, the transceiver unit is further configured to send user interaction information to a second communication device, where the user interaction information is used for determining the first background content.

With reference to the fourth aspect, in some implementations of the fourth aspect, the third background content is obtained by rendering and encoding the first background content by the second communication device.

With reference to the fourth aspect, in some implementations of the fourth aspect, the third background content is obtained by the second communication device from locally cached background content based on the first background content.

With reference to the fourth aspect, in some implementations of the fourth aspect, a processing unit is configured to determine the first indication information based on the user interaction information and second information. The second information indicates a status of the first communication device. The second information includes one or more of the following: a channel state of the first communication device, a total computing resource of the first communication device, an available computing resource of the first communication device, remaining power of the first communication device, or storage space of the first communication device.

With reference to the fourth aspect, in some implementations of the fourth aspect, the user interaction information includes one or more of the following: a pose change of a user of the terminal device, a position change of a user of the terminal device, or a control instruction of a user of the terminal device.

According to a fifth aspect, a communication apparatus is provided. The apparatus includes a transceiver unit, configured to receive first indication information from a terminal device. The first indication information indicates a processing unit to render first foreground content. The first foreground content is to-be-displayed foreground content of the terminal device. The transceiver unit is configured to receive second indication information from a second communication device. The second indication information indicates the processing unit to decode third background content. The third background content is determined based on first background content. The first background content is to-be-displayed background content of the terminal device. The transceiver unit is further configured to send first information to the terminal device. The first information includes second foreground content and second background content. The second foreground content is obtained by rendering the first foreground content. The second background content is obtained by decoding the third background content.

With reference to the fifth aspect, in some implementations of the fifth aspect, the third background content is obtained by rendering and encoding the first background content by the second communication device.

With reference to the fifth aspect, in some implementations of the fifth aspect, the third background content is obtained by the second communication device from locally cached background content based on the first background content.

With reference to the fifth aspect, in some implementations of the fifth aspect, the transceiver unit is further configured to send second information. The second information indicates a status of the first communication device. The second information includes one or more of the following: a channel state of the first communication device, a total computing resource of the first communication device, a computable resource of the first communication device, remaining power of the first communication device, or storage space of the first communication device.

According to a sixth aspect, a communication apparatus is provided. The apparatus includes a transceiver unit, configured to receive user interaction information from a terminal device, where the user interaction information is used for determining first background content, and the first background content is to-be-displayed background content of the terminal device. The transceiver unit is further configured to send second indication information to a first communication device, where the second indication information indicates the first communication device to decode third background content, and the third background content is determined based on the first background content.

With reference to the sixth aspect, in some implementations of the sixth aspect, a processing unit determines the first background content based on the user interaction information, and the processing unit determines the third background content based on the first background content.

With reference to the sixth aspect, in some implementations of the sixth aspect, the processing unit is configured to determine the third background content by rendering and encoding the first background content.

With reference to the sixth aspect, in some implementations of the sixth aspect, the processing unit is configured to determine the third background content from locally cached background content based on the first background content.

With reference to the sixth aspect, in some implementations of the sixth aspect, the transceiver unit is further configured to send the second indication information to the first communication device based on second information. The second information indicates a status of the first communication device. The second information includes one or more of the following: a channel state of the first communication device, a total computing resource of the first communication device, an available computing resource of the first communication device, remaining power of the first communication device, or storage space of the first communication device.

With reference to the sixth aspect, in some implementations of the sixth aspect, the processing unit is further configured to send the second indication information to the first communication device based on the second information and third information. The third information includes a bit rate identifier of the third background content.

With reference to the sixth aspect, in some implementations of the sixth aspect, the third information further includes a tile identifier of the third background content.

With reference to the sixth aspect, in some implementations of the sixth aspect, the user interaction information includes one or more of the following: a pose change of a user of the terminal device, a position change of a user of the terminal device, or a control instruction of a user of the terminal device.

According to a seventh aspect, a communication apparatus is provided and includes a processor. The processor is coupled to a memory. The memory is configured to store a program or instructions. When the program or the instructions are executed by the processor, the communication apparatus is enabled to perform the method in the first aspect, the second aspect, or the third aspect and the possible implementations of the first aspect, the second aspect, or the third aspect.

Optionally, there are one or more processors, and there are one or more memories.

Optionally, the memory may be integrated with the processor, or the memory may be disposed separately from the processor.

Optionally, a forwarding device further includes a transmitting machine (transmitter) and a receiving machine (receiver).

According to an eighth aspect, a communication system is provided and includes: a terminal device, configured to perform the method in any one of the first aspect and the possible implementations of the first aspect; a first communication device, configured to perform the method in any one of the second aspect and the possible implementations of the second aspect; and a second communication device, configured to perform the method in any one of the third aspect and the possible implementations of the third aspect.

According to a ninth aspect, a computer-readable medium is provided. The computer-readable medium stores a computer program (which may also be referred to as code or an instruction). When the computer program is run, a computer is enabled to perform the method in any one of the possible implementations of the first aspect, the second aspect, or the third aspect.

According to a tenth aspect, a chip system is provided and includes a memory and a processor. The memory is configured to store a computer program. The processor is configured to store the computer program. The processor is configured to invoke the computer program from the memory and run the computer program, so that a communication device in which the chip system is installed performs the method in any one of the first aspect, the second aspect, or the third aspect and the possible implementations of the first aspect, the second aspect, or the third aspect.

The chip system may include an input chip or interface configured to send information or data, and an output chip or interface configured to receive information or data.

DESCRIPTION OF EMBODIMENTS

Figures 1, 2:
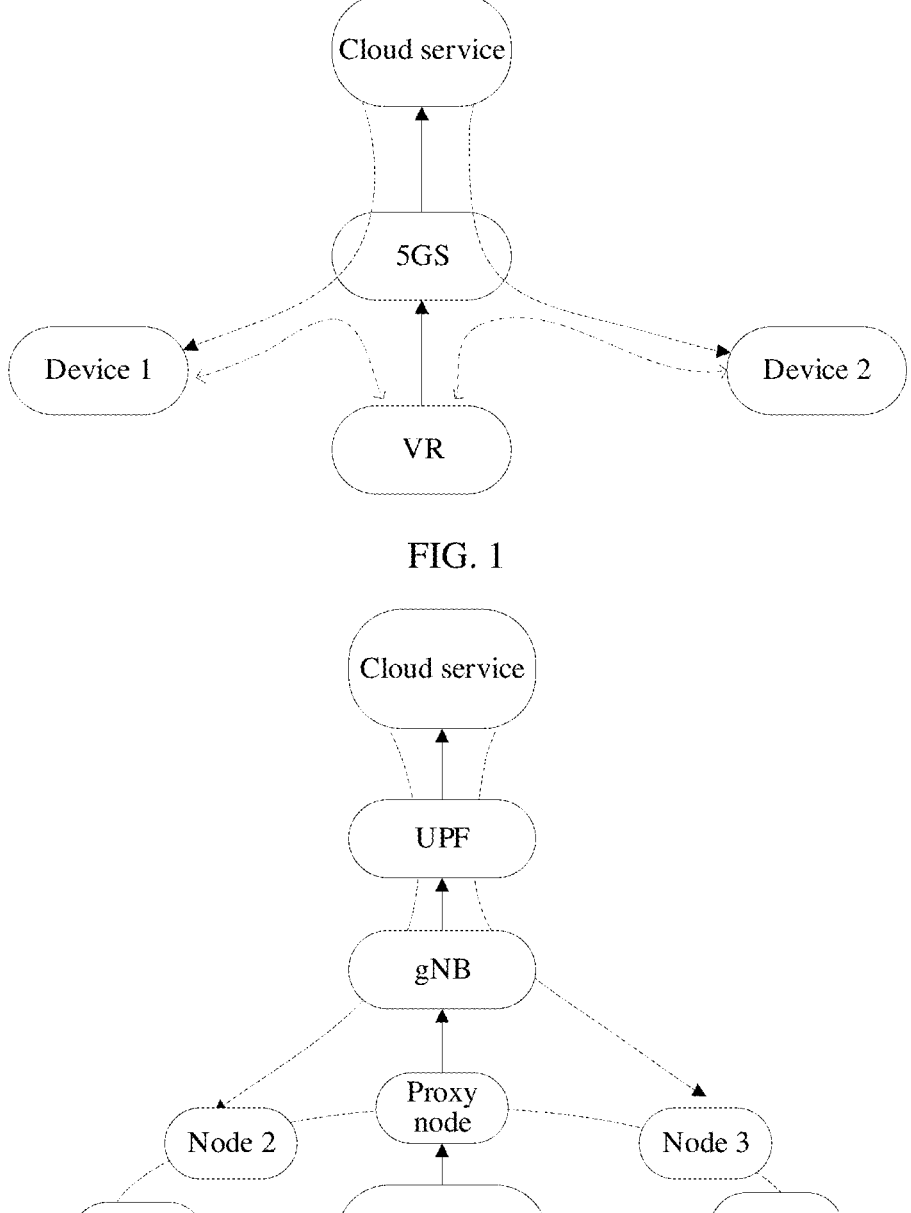
FIG. 1 is a diagram of a distributed rendering architecture according to this application.
FIG. 2 is a diagram of another distributed rendering architecture according to this application.

The following describes technical solutions of embodiments in this application with reference to accompanying drawings.

The technical solutions in embodiments of this application may be applied to various communication systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th Generation (5G) system, or a new radio (NR) system.

A terminal device in embodiments of this application is also referred to as user equipment (UE), a mobile station (MS), a mobile terminal (MT), VR glasses, an edge computing node, or the like. The terminal device is a device that provides a user with voice and/or data connectivity, and also includes a device that can perform sidelink communication, for example, a vehicle-mounted terminal, or a handheld terminal that can perform V2X communication. The VR glasses need to complete tasks such as reporting of user interaction information, foreground extraction, rendering task assignment of foreground content, and stream combination.

A first communication device in embodiments of this application may be an edge computing power node of the terminal device, or may be a computing power node that can provide a service for the terminal device. The computing power node needs to complete channel state information (CSI) feedback, computing power resource registration, and computing power status feedback, and assist a VR terminal device in completing decoding and rendering tasks. The computing power node may be a personal computer (PC), a mobile phone, a customer premise equipment (CPE), an intelligence network gateway (ING), a sinking content delivery network (CDN) device, or another VR device in a home network. The computing power nodes may be connected to each other in a sidelink manner or a 5GS manner. This is not limited in embodiments of this application.

A second communication device in embodiments of this application may be an access network device, a core network device, or a cloud server (which may also be referred to as an application layer).

The access network device in embodiments of this application is a radio access network (RAN) node (or device) that connects a terminal to a wireless network, and may also be referred to as a base station, a network device, or a communication device. For example, the access network device may be an NR gNB, or may be various types of base stations such as an LTE eNB. The base station uses a central unit-distributed unit (CU-DU) separation architecture.

The core network in embodiments of this application is mainly responsible for processing and routing app data. A user plane network element (UPF) in the core network is a function network element of a user plane, and is mainly responsible for connecting to an external network. The user plane function includes related functions of a serving gateway (SGW) and a public data network gateway (PDN-GW) in LTE, and is mainly responsible for forwarding a packet data packet, charging information statistics, and the like.

An application server (App) in embodiments of this application provides various different application data for the user. In this application, it is assumed that a server provides VR video service data.

Extended reality (XR) in this application refers to various real and virtual environments generated by using a computing technology and a wearable device, and human-machine interaction, and specifically includes the following typical forms: augmented reality (AR), mixed reality (MR), and virtual reality (VR).

For ease of understanding of a communication method provided in this application, in this application, a VR service in the XR is selected as a representative to describe in detail the method provided in this application. The method provided in this application is also applicable to another service in XR, for example, an AR service and an MR service. This is not limited in this application.

A complete process from initiation to completion of the VR service is described as follows. The VR terminal device (for example, a head mounted display) first captures a change of a pose, a position, and an instruction of a user, and sends such user interaction information to a server as a user request. The server then renders a video frame associated with the user request, and transmits a rendered picture back to the VR terminal device for display. Rendering is a process of generating a picture from a model, and the model is a representation of a three-dimensional object or a virtual environment defined by a programming language or a data structure.

The VR service requires low latency and a high rate. A VR video service requires that motion to photon (MTP) latency be less than 25 ms. To be specific, time from a moment at which a user's pose or position changes to a moment at which a video picture is displayed on the head mounted display needs to be less than 25 ms. If the MTP latency is greater than 25 ms, the user is to feel dizzy. In addition, a VR video service with 2K definition and a 60 FPS frame rate requires a bandwidth of about 30 Mbps. With the development of time, the VR service is gradually developing from initial immersion to deep immersion. The definition is developing from 2 K to 4 K and 8 K, the frame rate is developing from 60 FPS to 90 FPS and 120 FPS, and the bandwidth requirement is also developing from Mbps to Gbps. In addition, with the continuous evolution of the VR service, computing power required for rendering real-time VR video pictures is increasing. To meet a huge computing power requirement of the VR service, the VR service is gradually evolving from local rendering to cloud rendering. Therefore, this application is committed to proposing a brand new distributed rendering architecture, to meet a computing power requirement required for VR rendering, to further reduce transmission latency of the VR service, and enable the VR terminal device to be extremely lightweight.

Currently, a VR rendering architecture mainly includes local rendering, cloud rendering, terminal-cloud asynchronous rendering, and terminal-cloud collaborative rendering. The following describes these rendering architectures:

1. Local Rendering

All rendering tasks are performed on a local all-in-one VR terminal device or a server connected to the VR glasses in a wired manner. The local rendering is limited by a computing capability of a graphics processing unit (GPU) of a terminal. The definition can only reach 2K to 4K and a frame rate ranges from 30 FPS to 60 FPS. An advantage of the local rendering is that latency is low, and a real-time requirement of a user can be met. However, defects are apparent. The all-in-one VR terminal device or a local server has limited computing power and can only support rendering of a low-quality video. In addition, the VR terminal device needs to be connected to the server in a wired manner. Consequently, this limits mobility of a user using the VR terminal device.

2. Cloud Rendering

The VR terminal device captures changes of a pose and a position of a user, and uploads the changes to a cloud as user interaction information. The cloud renders a corresponding video picture in real time based on the user interaction information, encodes a rendered picture, and then transmits an encoded picture to the VR terminal device. The VR terminal device decodes the video picture and displays a decoded video picture on a head mounted display device. The cloud rendering architecture can use an advantage of cloud cluster computing power to provide a high definition VR video rendering service. However, end-to-end transmission latency becomes a bottleneck that restricts development of a service of a VR terminal device to deep immersion.

3. Terminal-Cloud Asynchronous Rendering

A core idea of the terminal-cloud asynchronous rendering is that a VR server renders a picture frame of a view angle in advance and transmits the frame to the VR terminal device. The VR terminal device can perform latest pose correction based on the frame. Compared with the cloud rendering architecture, the terminal-cloud asynchronous rendering architecture is improved by introducing an asynchronous time warp technology. The asynchronous time warp technology means that, when a current video frame fails to be transmitted to a VR terminal device within an MTP latency range, the VR terminal device may compensate, by rotating a video frame that is successfully received last time, for a deviation caused by head rotation. Therefore, in the terminal-cloud asynchronous rendering architecture, the end-to-end transmission latency can be extended from 25 ms in the cloud rendering architecture to 50 ms to 70 ms, so that an existing network can support cloud VR video services. However, application of the asynchronous time warp technology also causes a black edge effect or a distortion phenomenon of a video frame viewed by a user. Consequently, user experience is damaged.

4. Terminal-Cloud Collaborative Rendering

To avoid the black edge effect or the distortion phenomenon caused by the asynchronous time warp technology, the terminal-cloud collaborative rendering architecture is widely mentioned in the academic field. However, the terminal-cloud collaborative rendering architecture has not been put into commercial use due to application ecosystem problems. A core idea of the terminal-cloud collaborative rendering architecture is to divide a rendering task into two parts, where a cloud server and a local terminal device are separately responsible for a part of the rendering task.

The rendering task may be divided in the following three manners.

A first method is a method for separating a foreground and a background. Although a foreground part is highly random and difficult to predict, a rendering task volume is small, and the foreground is rendered locally. Although a background part is continuous and predictable, a rendering task volume is large, and the background is rendered on the cloud. In addition, the cloud may render a plurality of future video frames in advance based on changes of a pose and a position of a user, and transmit the plurality of future video frames to the VR terminal device in advance. Therefore, impact of latency may not be considered during transmission of the background part. A subsequent transmission architecture design of this application is further described based on this rendering task segmentation method.

A second method is a human fixation point-based segmentation method. Content near a fixation point is rendered locally, and content around the fixation point is rendered on the cloud.

A third method is a tile-based segmentation method. First, a complete video frame is divided into several rectangular blocks of equal sizes, and a terminal and the cloud are separately responsible for rendering a part of tiles.

It should be understood that, because the asynchronous time warp technology is not used in the terminal-cloud collaborative rendering, a black edge effect and a distortion phenomenon can be avoided. However, because the terminal needs to undertake a part of a rendering task and a decoding task, the terminal still needs to have specific computing power, so that the VR terminal device cannot be further lightweight.

It can be learned from the foregoing description that the mobility problem is mainly for the local rendering. The VR terminal device may need to be connected to the server in a wired manner to obtain computing power support, to complete the rendering task. Therefore, a user of the VR terminal device is restricted to a specific area, and mobility is limited to some extent. A latency problem is mainly for the cloud rendering. In the cloud rendering, all rendering tasks are performed on the cloud. The VR terminal device first needs to send a user request to the cloud, and the cloud renders a video based on the request, compresses a rendered picture, and sends a compressed picture to the VR terminal device. After receiving compressed data, the VR terminal device further needs to decompress the compressed data to restore the video frame. However, current network performance cannot meet requirements of a cloud rendering system for reporting a request, performing rendering, performing encoding, performing transmission, and performing decoding within the MTP latency. For a bandwidth problem, as the VR service develops to a deep immersive mode, for example, an 8K definition and 120 FPS VR high definition video, a bandwidth required by one user may exceed 1 Gbps. When a plurality of users using VR terminal devices initiate requests at the same time, a wireless bearer network is under great pressure, causing network congestion. As a result, the end-to-end transmission latency is far longer than the MTP latency, and user experience is affected.

This application provides a communication method based on the terminal-cloud collaborative rendering. The method is based on a terminal-cloud distributed rendering architecture with computing-network perception convergence. A core idea of this application is as follows. A plurality of nodes having computing and communication capabilities are constructed into a computing set. The VR terminal device and the cloud server may assign a corresponding task based on communication quality and a computing resource of each node in the computing set. After completing the task, the node feeds back data to the VR terminal device. In this application, different rendering and transmission mechanisms are designed based on different computing network information perception objects of the computing node.

It should be noted that the terminal device in this application may be a VR terminal device, an AR terminal device, or an MR terminal device. This is not limited in this application.

It should be further noted that, in a specific embodiment of this application, a VR terminal device is used as an example to describe in detail the communication method provided in this application. The first communication device in this application may be an edge computing power node of the terminal device, or may be a computing power node that can provide a service for the terminal device. This is not limited in this application. The second communication device in this application may be a cloud server (or referred to as an application layer), a core network device (for example, a user plane network element UPF), or an access network device (for example, a gNB). In this application, different cases of the second communication device in the foregoing example are described in detail with reference to specific embodiments.

FIG. 1 is a diagram of a distributed rendering architecture according to this application. For example, in a manner of separate rendering of a foreground and a background of a to-be-displayed picture of a terminal device, a cloud server is responsible for rendering and encoding background content, and a VR terminal device is responsible for perceiving and sending user interaction information. The user interaction information includes a pose change and/or a position change and/or a control instruction of a user who uses the VR terminal device.

A first communication device separately completes a decoding task from the cloud server (which may also be referred to as an application layer) and a rendering task from the VR terminal device, and after completing the decoding task and the rendering task, uniformly transmits data to the VR terminal device. The VR terminal device then combines all data to generate a final video image, and displays the video image.

It should be noted that the first communication device does not necessarily need to complete the decoding task or the rendering task at the same time. For example, a specific node may be selected by the cloud server to complete only a decoding task of the background content, and a specific node may be selected to complete only a rendering task of the foreground content.

Figure 7:
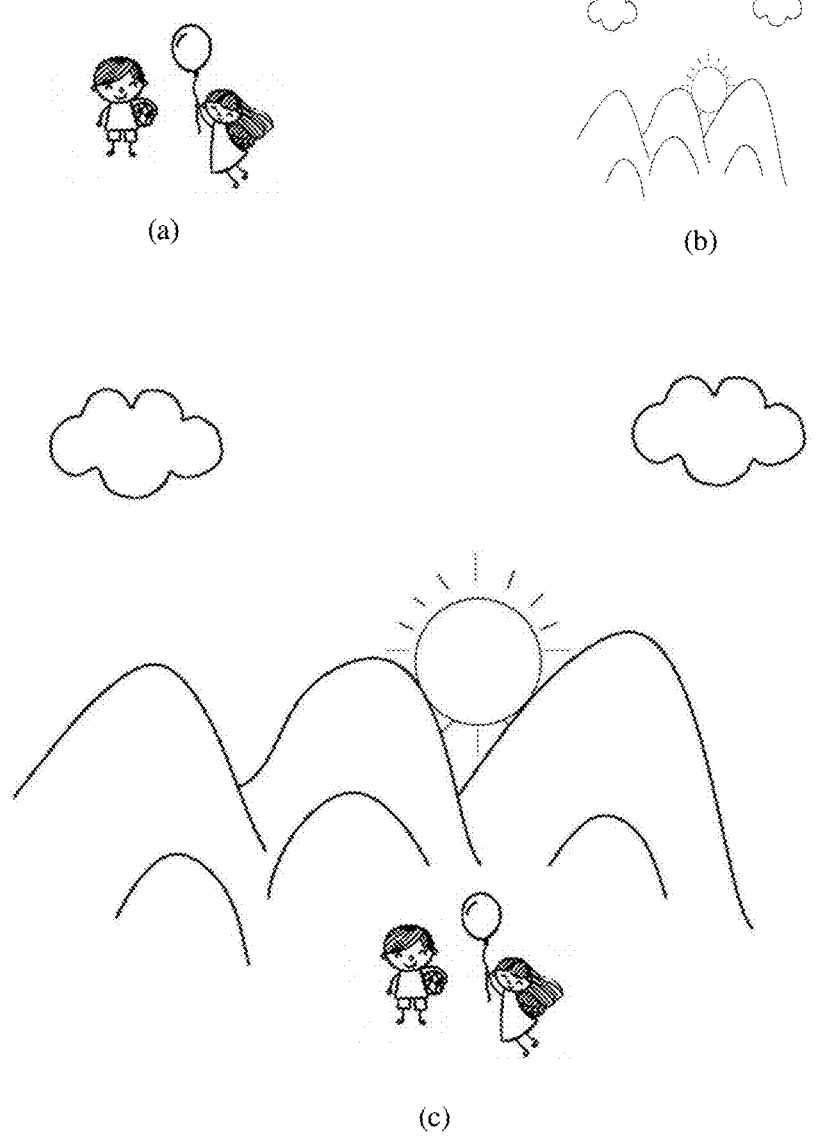
FIG. 7 is a diagram of an example of a display picture according to this application.

For the foreground content and the background content mentioned in this application, by way of example, and not limitation, in this embodiment of this application, the terminal device may present a display interface used to display a video or a photographed picture, as shown in FIG. 7. It should be understood that the display interface in FIG. 7 is merely an example for description, and this application is not limited thereto. The interface displayed in FIG. 7 may alternatively be a human-computer interaction interface presented by the terminal device when the terminal device detects a user operation. By way of example, and not limitation, as shown in FIG. 7, it may be considered that (a) in FIG. 7 shows foreground content obtained after processing is completed (to be specific, first foreground content is processed to obtain second foreground content), and (b) shows background content obtained after processing is completed (to be specific, first background content is processed to obtain second background content). After receiving (a) and (b) in FIG. 7, the terminal device performs combination to obtain (c) shown in FIG. 7 for display.

FIG. 2 is a diagram of another distributed rendering architecture according to this application. It can be learned from FIG. 2 that a VR terminal device (that is, a terminal device) sends user interaction information to an access network device. The access network device sends the user interaction information to a core network device. The core network device sends the user interaction information to a cloud server. The cloud server further determines, based on the user interaction information, first background content to be displayed by the VR terminal device, and performs rendering and encoding based on the first background content to obtain third background content, or in other words, the third background content is background content obtained by rendering and encoding the first background content.

Optionally, when the cloud server perceives a status of a first communication device (for example, a node 1, a node 2, . . . in FIG. 2), the cloud server may divide rendered first background content into a plurality of blocks of a same size. For example, the cloud server divides the rendered first background content into four blocks of a same size, including S1, S2, S3, and S4. The cloud server encodes each tile. The cloud server may encode each tile into a matched bit rate based on a status of the first communication device. A higher bit rate indicates a larger data amount of encoded data to be transmitted, and a higher computing requirement. Therefore, a high requirement is imposed on communication quality and a higher computing capability of the first communication device. When the cloud server does not know the status of the first communication device, the cloud server may encode the tiles into a same bit rate or different bit rates for data transmission.

The cloud server generates different internet protocol (internet protocol, IP) data flows for encoded data of the tiles for transmission to the core network device. After receiving the IP data flows, the core network device maps each IP data flow to a corresponding quality of service (quality of service, QoS) data flow, and transmits the QoS data flow to the access network device. When the cloud server perceives the status of the first communication device, the core network device and the access network device only need to perform corresponding mapping transmission based on data transmitted by the cloud server, and do not need to perform additional data processing.

Optionally, when the core network device (UPF) perceives the status of the first communication device, the cloud server may divide the rendered first background content into a plurality of blocks of a same size. For example, the cloud server divides the rendered first background content into four blocks of a same size, including S1, S2, S3, and S4. The cloud server may encode each tile into different bit rate versions (for example, the tile S1 may be encoded into four different bit rate versions: 1 Mbps, 2 Mbps, 3 Mbps, and 4 Mbps), and then transmit, to the core network device, an IP data flow generated after encoding each tile. The core network device selects an appropriate first communication device to decode encoded background content. The core network device selects, from IP data flows received from the cloud server, a bit rate version that is adaptive to a status of the first communication device, and then maps the bit rate version to the different QoS data flows for transmission to the access network device. After receiving the QoS data flows, the access network device separately maps the QoS data flows to different data radio bearers (DRBs) for transmission to a target first communication device.

The cloud server transmits background content blocks of different rate versions to the core network device, and a distributed transmission architecture in which the core network device perceives status information of the first communication device may be further divided into the following two cases:

Case 1: One-IP Flow→Multi-QoS Flow. To be specific, the cloud server divides the rendered background content into different tiles, encodes the different tiles based on different rate versions, and places, into a same IP data flow for transmission to the core network device, data packets obtained through encoding. Because different rate versions of different tiles are placed in a same IP data flow, a tile identifier and a bit rate identifier need to be added to the IP data flow to assist the core network device in recognizing content that needs to be selected from the IP data flow and that needs to be mapped to a QoS data flow.

Case 2: Multi-IP Flow→Multi-QoS Flow. To be specific, the cloud server divides the rendered background content into different tiles, encodes the different tiles based on different rate versions, and places, into different IP data flows for transmission to the core network device, data packets obtained through encoding. Because each IP data flow includes only different bit rate versions of a same tile, a bit rate identifier further needs to be added to each bit rate version in an IP data flow, to assist the core network device in selecting an appropriate bit rate from all bit rate versions and mapping the bit rate to a QoS data flow.

In the foregoing two cases, the cloud server needs to add some application assistance information to an IP extension header in the IP data flow transmitted to the core network device, to help the core network device distinguish between the different IP data flows. The application assistance information may include a tile identifier corresponding to an IP data flow, a bit rate identifier corresponding to the IP data flow, and the like.

Optionally, when the access network device perceives the status of the first communication device, the cloud server may divide the rendered first background content into tiles. The cloud server may encode each tile into different bit rate versions, and then transmit, to the core network device, an IP data flow generated after encoding each tile. The core network device selects, from IP data flows received from the cloud server, a bit rate version that is adaptive to a status of the first communication device, and then maps the bit rate version to different QoS data flows for transmission to the access network device. The access network device selects an appropriate first communication device to decode encoded background content, and separately maps the different QoS data flows to different DRBs for transmission to a target first communication device.

Based on different manners in which the cloud server transmits the background content blocks to the access network device, a distributed transmission architecture in which the access network device perceives status information of the first communication device may be further divided into the following two cases:

Case 1: One-IP Flow→One-QoS Flow→Multi-DRB. To be specific, the cloud server divides the rendered background content into different tiles, encodes the different tiles based on different rate versions, and places, into a same IP data flow for transmission to the core network device, data packets obtained through encoding. The core network device then maps one received IP data flow to one QoS data flow, and transmits the QoS data flow to the access network device. Because the core network device places the tiles of the different rate versions in the same QoS data flow, a tile identifier and a bit rate identifier need to be added to the QoS data flow sent by the core network device, to assist the access network device in selecting an appropriate first communication device, and a QoS data flow that matches the status of the first communication device is mapped to a DRB of the first communication device.

Case 2: Multi-IP Flow→Multi-QoS Flow→Multi DRB. The cloud server divides the rendered background content into different tiles, encodes the different tiles based on different rate versions, and places, into different IP data flows for transmission to the core network device, data packets obtained through encoding. The core network device then maps a plurality of received IP flows to a plurality of QoS data flows in a one-to-one manner for transmission to the access network device. Because each QoS data flow includes different bit rate identifiers of a same tile, the QoS data flow further needs to carry a bit rate identifier. The bit rate identifier is used for assisting the access network device in selecting an appropriate first communication device from all bit rate versions, and a QoS data flow that matches the status of the first communication device is mapped to a DRB of the first communication device.

FIG. 2 mainly describes a case in which the cloud server further determines the first background content based on the user interaction information, and performs rendering based on the first background content to obtain the rendered first background content. The cloud server performs tile encoding on the rendered first background content, and places, into an IP data flow for transmission to the core network device, background content obtained through the tile encoding. The core network device further performs mapping based on the IP data flow to obtain a QoS data flow. The core network device sends the QoS data flow to the access network device. The access network device maps the received QoS data flow to a DRB of a corresponding first communication device.

In addition, FIG. 2 further describes a case in which three different devices, namely, the cloud server, the core network device, and the access network device, separately perceives the status of the first communication device, and further determines, based on the status of the first communication device, to transmit the encoded background content to the first communication device that can demodulate the background content.

FIG. 2 describes in detail specific data flows used for transmission between the cloud server, the core network device, and the access network device. There are also a plurality of connection manners between the terminal device, the first communication device, and the access network device. This application mainly lists the following manners.

Manner 1

The terminal device and the first communication device separately establish a connection to the access network device. In this connection manner, the terminal device sends the user interaction information to the access network device, and the first communication device sends, to the access network device, second information indicating the status of the first communication device. The access network device then determines, based on a second communication device that specifically perceives the first communication device, whether to further transmit the user interaction information and the second information to an upper layer. Communication between the terminal device and the first communication device needs to be performed based on a Uu air interface.

Manner 2

First communication devices (for example, computing power nodes) at an edge of the terminal device are combined into a computing set, and one of the first communication devices is selected from the computing set as an agent node. In this case, the terminal device may send the user interaction information to the agent node, and then the agent node transmits the user interaction information to the access network device. The access network device then determines, based on the second communication device that specifically perceives the first communication device, whether to further transmit the user interaction information to the upper layer. The computing power nodes in the computing set also send, to the agent node, second information indicating statuses of the computing power nodes, and then the agent node sends the second information of all the nodes to the access network device in a unified manner. The access network device further determines, based on the second communication device that specifically perceives the first communication device, whether to further transmit the user interaction information to the upper layer. In this manner, the terminal device completes communication with each computing power node through the agent node.

Manner 3

The terminal device and the first communication device may directly perform sidelink communication. Compared with Manner 1, this manner has lower latency, but a rate limitation between sidelink communication devices may also become a bottleneck of this manner.

The foregoing manners separately describe a connection manner between the terminal device and the access network device and a connection manner between the first communication device and the access network device.

The following further describes that, after the terminal device establishes a connection to the first communication device, the terminal device further divides, into one or more different tasks for transmission to one or more first communication devices, foreground content that needs to be rendered, and the one or more first communication devices render the first foreground content. When the terminal device determines first indication information, that is, a foreground rendering task is assigned, there may be the following several manners.

Manner 1

The terminal device may divide the foreground rendering task into a plurality of tasks based on the user interaction information, and the terminal device separately sends, to a plurality of first communication devices, the plurality of subtasks obtained through division. The plurality of first communication devices perform rendering based on the received rendering tasks.

Manner 2

The terminal device properly divides the foreground rendering task based on the user interaction information and statuses (that is, the second information) of first communication devices, and transmits, to a corresponding first communication device, each subtask determined through division. The first communication device receives the rendering task and performs rendering.

Manner 3

The terminal device directly sends to-be-rendered foreground content to an agent first communication device (that is, an agent node), and the agent node further completes distribution of a foreground rendering task based on a size of the to-be-rendered foreground content and a status of each computing power node. The agent node indicates a foreground content rendering task of each node.

Figure 3:
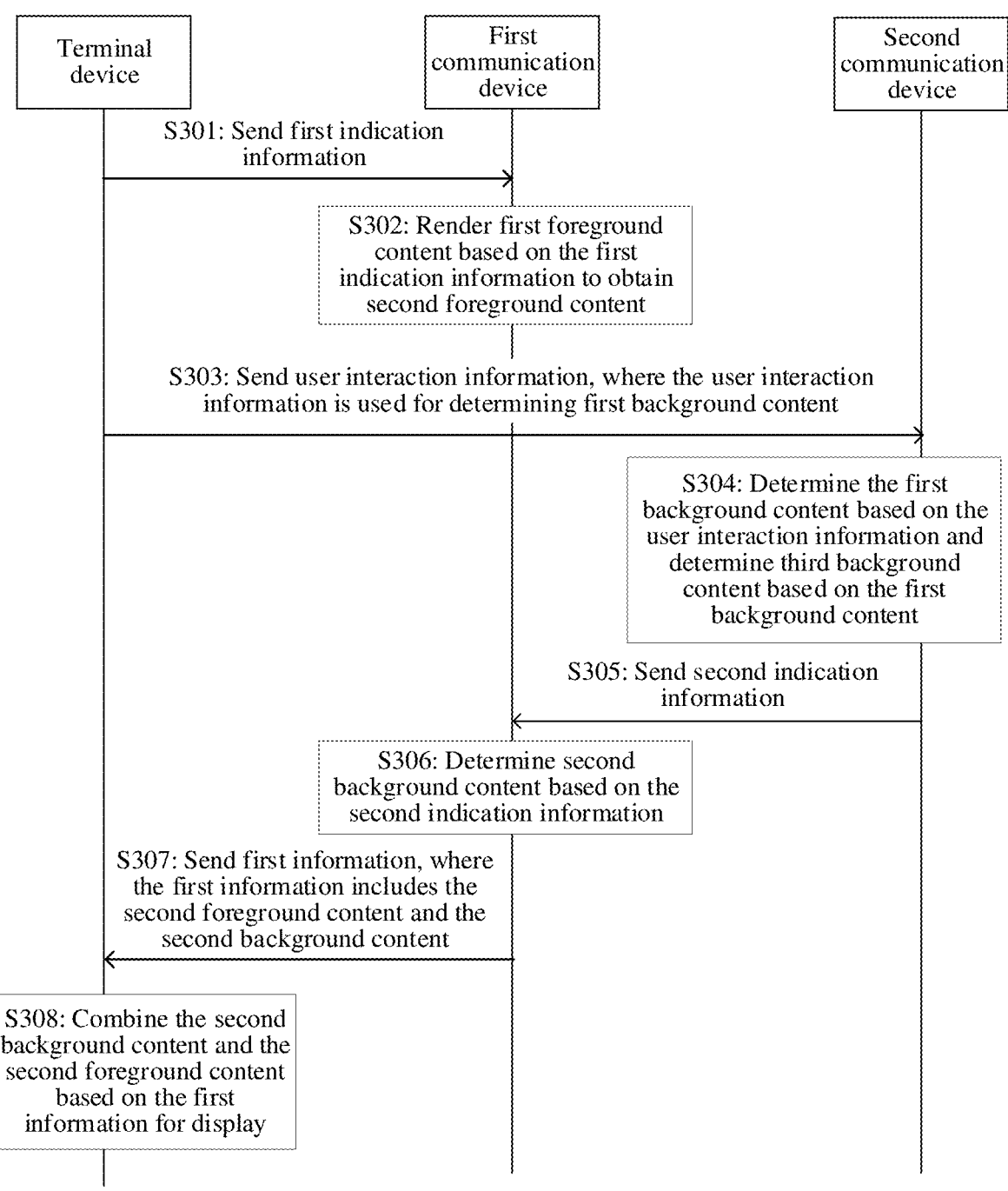
FIG. 3 is a block diagram of a communication method according to this application.

It should be understood that, after a first communication device completes a related rendering task and/or decoding task, the first communication device transmits a data flow to the terminal device (for example, step S308 shown in FIG. 3). In a same way as the foregoing three manners, the first communication device may directly transmit the data flow to the terminal device, or may first transmit the data flow to the agent node, and then the agent node transmits the data flow to the terminal device. Then, the terminal device combines, into a complete video frame for further display, data flows received from the first communication devices.

It should be noted that, in this application, a first communication device completing a rendering task and a first communication device completing a decoding task may be a same communication device, or may be different communication devices; or in this application, a first communication device completing a rendering task and a first communication device completing a decoding task may be a same computing power node, or may be different computing power nodes. This is not limited in this application.

FIG. 3 is a diagram of a communication method according to an embodiment of this application. The method shown in FIG. 3 includes the following steps.

S301: A terminal device sends first indication information to a first communication device.

Accordingly, the first communication device receives the first indication information from the terminal device.

The first indication information indicates the first communication device to render first foreground content, and the first foreground content is to-be-displayed foreground content of the terminal device.

It should be understood that a to-be-displayed picture of the terminal device includes foreground content and background content. The to-be-displayed foreground content is referred to as "first foreground content" in this application, and to-be-displayed background content is referred to as "first background content" in this application.

It should be further understood that the to-be-displayed picture in this application may be an original rendering material obtained by the terminal device or an unprocessed picture.

Optionally, the terminal device determines the first indication information based on user interaction information and second information. The second information indicates a status of the first communication device. The second information may include one or more of the following: a channel state of the first communication device, a total computing resource of the first communication device, an available computing resource of the first communication device, remaining power of the first communication device, or storage space of the first communication device.

The remaining power of the first communication device is a value of remaining power when the first communication device completes another task, that is, the remaining power of the first communication device.

It should be understood that the terminal device may determine, based on the user interaction information, the first foreground content that needs to be rendered, then determine, based on the status of the first communication device, that the first communication device has a capability of completing rendering the first foreground content, and finally send the first indication information to the first communication device. When the terminal device determines that a plurality of first communication devices (that is, a plurality of computing power nodes) are to complete rendering of the first foreground content, the second information may include channel states, total computing resources, available computing resources, remaining power, storage space, or the like of the plurality of first communication devices. The terminal device further determines, based on the first foreground content and statuses of the plurality of first communication devices, a task assignment status for rendering the first foreground content, and sends the first indication information to the first communication devices.

It should be further understood that the terminal device may divide, based on the user interaction information, the first foreground content that needs to be rendered into different subtasks. The terminal device assigns, to different first communication devices, the divided subtasks for rendering the first foreground content, and the plurality of first communication devices render different foreground content at the same time, thereby shortening total time for rendering foreground content of the to-be-displayed picture of the terminal device, reducing latency, improving rendering efficiency, improving rendering quality, and further improving user experience.

It should be noted that the first communication device may be a computing power node, or the first communication device may be a computer, a mobile phone, a display, or a router in a home network, or may be another VR device. When the first communication device has redundant computing power, the first communication device needs to register computing power with a core network, an application server, or an access network device. A registered first communication device may be invoked to complete a corresponding computing task. The computing task may include but is not limited to encoding computing, content rendering, decoding computing, encryption, or the like.

S302: The first communication device renders the first foreground content based on the first indication information to obtain second foreground content.

Specifically, after the first communication device receives the first indication information from the terminal device, the first communication device renders the first foreground content based on the first indication information to obtain the second foreground content, or in other words, the second foreground content is obtained by rendering the first foreground content.

It should be noted that, the first indication information may carry the first foreground content, and after receiving the first indication information, the first communication device performs rendering based on the first foreground content in the first indication information. Alternatively, the first indication information and the first foreground content are transmitted to the first communication device in different pieces of information, and the first communication device renders the first foreground content based on the first indication information after separately receiving the first foreground content and the first indication information. Alternatively, the first indication information is received by the first communication device from the terminal device, and the first foreground content is determined by the first communication device based on the obtained user interaction information. This is not limited in this application.

It should be further noted that the first indication information may be alternatively sent by the terminal device to the first communication device in another form. For example, in Manner 1, when both the terminal device and the first communication device have a material library for rendering the foreground content, the terminal device only needs to indicate information such as a number of a rendering material or a rendering parameter to the first communication device. Manner 2: When the first communication device does not have a rendering material library, the terminal device needs to send information such as a to-be-rendered material and a rendering parameter to the first communication device.

S303: The terminal device sends the user interaction information to a second communication device, where the user interaction information is used for determining the first background content.

The terminal device may send the user interaction information to the second communication device, and accordingly, the second communication device receives the user interaction information from the terminal device.

Optionally, the user interaction information includes one or more of the following: a pose change of a user of the terminal device, a position change of a user of the terminal device, or a control instruction of a user of the terminal device.

The user control instruction may be a control instruction sent by a user through a controller, or may be a control instruction sent by a user in another manner. This is not limited in this application.

S304: The second communication device receives the user interaction information from the terminal device.

Specifically, the terminal device sends the user interaction information to the second communication device, and accordingly, the second communication device receives the user interaction information from the terminal device.

Optionally, the second communication device determines to-be-displayed first background content of the terminal device based on the user interaction information.

The second communication device further determines third background content based on the first background content.

Optionally, the third background content may be obtained by rendering and encoding the first background content by the second communication device, or the third background content may be obtained by the second communication device from locally cached background content based on the user interaction information or the first background content.

Figure 4:
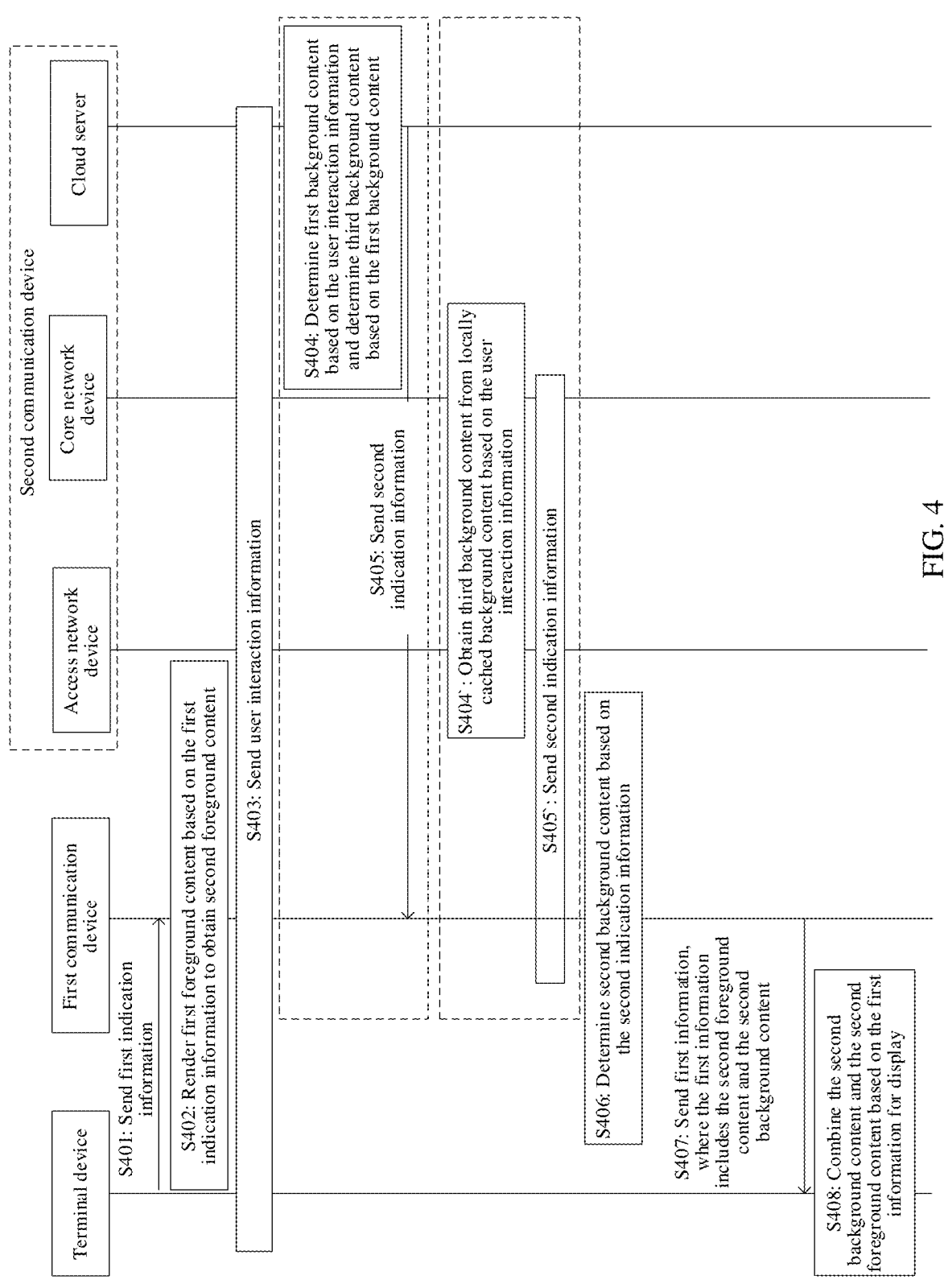
FIG. 4 is a block diagram of a communication method according to this application.

For detailed descriptions, refer to the descriptions in steps S404, S405, S404, and S405' in FIG. 4. Details are not described herein again.

It should be noted that the second communication device receives the user interaction information and the second communication device perceives the status of the first communication device (that is, obtains the second information), which are two decoupled things. The second information may be separately perceived and obtained by a cloud server, the access network device, and a core network device. The user interaction information is generally sent by the terminal device to the cloud server, and background content is rendered based on the user interaction information. Then, the cloud server transmits rendered and encoded content to the access network device and the core network device. In a transmission process, the access network device or the core network device may locally establish a cache table to store a mapping relationship between background content with a high request degree and user interaction information of the background content. In this way, after receiving the user interaction information again, the access network device or the core network device may directly compare the user interaction information with the existing background content in the cache table. If the mapping relationship exists, the cached background content is directly sent to the first communication device without continuing to upload the user interaction information to the cloud server.

As shown in FIG. 3, the method further includes the following steps.

S305: The second communication device sends second indication information to the first communication device, or in other words, the first communication device receives second indication information from the second communication device.

Specifically, the second communication device may determine the first background content based on the user interaction information, and render and encode the first background content, that is, the third background content is determined after the first background content is rendered and encoded. Alternatively, the second communication device may determine the first background content based on the user interaction information, and obtain, from the locally cached background content based on the first background content, the third background content obtained through rendering and encoding, that is, the third background content is determined after the first background content is rendered and encoded. Alternatively, a mapping relationship between the user interaction information and the third background content exists in a local cache table of the second communication device, and the second communication device may further directly obtain the corresponding third background content based on the user interaction information. The second communication device sends the second indication information to the first communication device. The second indication information indicates the first communication device to determine the second background content by decoding the third background content.

It should be noted that, when the access network device is the second communication device, the access network device perceives the first communication device, and the access network device sends the second indication information to a first access network device. When the core network device is the second communication device, the core network device perceives the first communication device, and the core network device sends the second indication information to a first access network device. When the cloud server is the second communication device, the cloud server perceives the first communication device, and the cloud server sends the second indication information to the first access network device.

Optionally, the second communication device determines the second indication information based on the second information, and sends the second indication information to the first communication device. The second information indicates the status of the first communication device.

Optionally, the second information includes one or more of the following: a channel state of the first communication device, a total computing resource of the first communication device, an available computing resource of the first communication device, remaining power of the first communication device, or storage space of the first communication device.

Optionally, the second communication device determines the second indication information based on the second information and third information, and sends the second indication information to the first communication device. The third information includes a bit rate identifier of the third background content.

Optionally, the third information further includes a tile identifier of the third background content.

S306: The first communication device determines the second background content based on the second indication information.

Specifically, after the first communication device receives the second indication information from the second communication device, the first communication device decodes the third background content based on the second indication information, to obtain the second background content.

S307: The terminal device receives first information, where the first information includes the second foreground content and the second background content.

Accordingly, the first communication device sends the first information to the terminal device.

Specifically, the first communication device renders the first foreground content based on the first indication information to obtain the second foreground content, the first communication device decodes the third background based on the second indication information of the second communication device to obtain the second background content, and the first communication device sends the second foreground content and the second background content to the terminal device as the first information.

It should be understood that there may be one or more first communication devices that determine and obtain the second foreground content and the second background content, and this is not limited in this application. The second foreground content and the second background content may be sent to the terminal device in a same piece of information, or may be carried in different pieces of information to be sent to the terminal device, and this is not limited in this application. The second foreground content and the second background content may be sent simultaneously, or may be sent sequentially, and this is not limited in this application.

After the terminal device receives the first information from the first communication device, in the method shown in FIG. 3, the method further includes the following steps.

S308: The terminal device combines the second background content and the second foreground content based on the first information for display.

Specifically, for synthesis of final display content of the terminal device, after the first communication device completes a task of rendering the first foreground content and/or decoding encoded background content, the first communication device sends a data flow to the terminal device, and then the terminal device performs synthesis to obtain a final video and presents the final video on the terminal device.

According to the solution shown in FIG. 3, in the technical solution in this application, the first communication device assists the terminal device in completing tasks of rendering the first foreground content and decoding the encoded background content. In comparison with a conventional technology, the terminal device is prevented from rendering and decoding tasks, so that a computing amount of the terminal device is reduced, and the terminal device is lightweight, thereby improving user experience. In addition, the first communication device may include a plurality of computing power nodes, and the rendering and decoding tasks may be assigned to the plurality of computing power nodes for simultaneous execution, thereby reducing latency and meeting a requirement of the terminal device for high service computing power.

FIG. 4 is a block diagram of another communication method according to an embodiment of this application. With reference to FIG. 4, the following describes in detail a specific description in which a second communication device determines, when the second communication device is separately a cloud server, a core network device, or an access network device, third background content and the second communication device sends second indication information to a first communication device, where the second indication information indicates the first communication device to decode the third background content. As shown in FIG. 4, the method includes the following steps.

S401: A terminal device sends first indication information to the first communication device.

Accordingly, the first communication device receives the first indication information from the terminal device.

The first indication information indicates the first communication device to render first foreground content, and the first foreground content is to-be-displayed foreground content of the terminal device.

S402: The first communication device renders the first foreground content based on the first indication information to obtain second foreground content.

Specifically, after the first communication device receives the first indication information from the terminal device, the first communication device renders the first foreground content based on the first indication information to obtain the second foreground content, or in other words, the second foreground content is obtained by rendering the first foreground content.

S403: The terminal device sends user interaction information to the second communication device.

Specifically, when the terminal device determines that a position, a pose, or a control instruction of a user who uses the terminal device changes, the terminal device determines the user interaction information based on a change.

Optionally, the user interaction information includes one or more of the following: a pose change of a user of the terminal device, a position change of a user of the terminal device, or a control instruction of a user of the terminal device.

When the second communication device is the access network device, the core network device, or the cloud server, the second communication device receives the user interaction information from the terminal device, and further determines the third background content based on the user interaction information. The second communication device determines the second indication information based on the third background content, and sends the second indication information to the first communication device.

When the second communication device is the cloud server, in the method shown in FIG. 4, the method further includes the following steps.

S404: The cloud server determines first background content based on the user interaction information, and determines the third background content based on the first background content.

Specifically, when the second communication device is the cloud server (or an application layer), in a possible implementation, the terminal device first sends the user interaction information to the access network device. When the access network device determines that the cloud server perceives a status of the first communication device, the access network device sends the user interaction information to the core network device. The core network device sends the user interaction information to the cloud server. The cloud server further determines the first background content based on the user interaction information, and renders and encodes the first background content based on the first background content to obtain the third background content, or in other words, the third background content is background content obtained by rendering and encoding the first background content.

S405: The cloud server sends the second indication information to the first communication device.

Specifically, the cloud server determines the first background content based on the user interaction information, and renders and encodes the first background content, that is, the third background content is determined after the first background content is rendered and encoded. The cloud server sends the second indication information to the first communication device. The second indication information indicates the first communication device to determine the second background content by decoding the third background content.

Optionally, when the cloud server perceives the status of the first communication device, the cloud server determines the second indication information based on second information, and sends the second indication information to the first communication device. The second information indicates the status of the first communication device.

Optionally, the second information includes one or more of the following: a channel state of the first communication device, a total computing resource of the first communication device, an available computing resource of the first communication device, remaining power of the first communication device, or storage space of the first communication device.

Optionally, the cloud server determines the second indication information based on the second information and third information, and sends the second indication information to the first communication device. The third information includes a bit rate identifier of the third background content.

Optionally, the third information further includes a tile identifier of the third background content.

When the second communication device is the core network device or the access network device, in the method shown in FIG. 4, the method further includes the following steps.

S404': The access network device or the core network device obtains the third background content from locally cached background content based on the user interaction information.

Specifically, when the second communication device is the access network device (for example, a gNB) or the core network device (for example, a UPF), in a possible implementation, the terminal device first sends the user interaction information to the access network device, and the access network device first queries whether corresponding background content (that is, the third background content) is cached in the locally cached background content. If the corresponding background content is cached in the locally cached background content, the access network device further determines the second indication information based on the status of the first communication device (that is, the second information). If the corresponding background content is not cached in the locally cached background content, the access network device sends the user interaction information to the core network device. The core network device further determines whether the core network device locally caches corresponding background content (that is, the third background content). If the core network device locally caches the corresponding background content, the core network device further determines the second indication information. If the core network device does not locally cache the corresponding background content, the core network device then sends the user interaction information to the cloud server, and the cloud server further determines the first background content based on the user interaction information, and renders and encodes the first background content to determine the third background content.

The core network device or the access network device may establish a local cache, and may locally cache background content of different rate versions, and establish a corresponding data mapping table. After receiving the user interaction information from the terminal device, the core network device or the access network device first queries whether the corresponding background content is cached locally. If the cached background content is found, a corresponding bit rate version is directly selected based on the second information of the first communication device. If the cached background content is not found, the user interaction information is then transmitted to the cloud server, and the cloud server further determines the first background content, and performs rendering and encoding. To enable the core network device and the access network device to recognize the user interaction information of the terminal device, a MEC may be sunk to the access network device or the core network device side. When there are a plurality of user requests of the terminal device, the access network device and the core network device cache content with high popularity, further facilitating reduction in latency of end-to-end transmission of a video and improving efficiency.

It should be noted that, after receiving the user interaction information, the access network device or the core network device may directly obtain the corresponding third background content from the locally cached background content based on the user interaction information; or after receiving the user interaction information, the access network device or the core network device may also first determine the first background content based on the user interaction information, and obtain the corresponding third background content from the locally cached background content based on the first background content.

S405': The access network device or the core network device sends the second indication information to the first communication device.

When the access network device perceives the status of the first communication device, the access network device may further determine the second indication information based on the second information, and sends the second indication information to the first communication device. When the core network device perceives the status of the first communication device, the core network device may further determine the second indication information based on the second information, and sends the second indication information to the first communication device.

Optionally, the second information includes one or more of the following: a channel state of the first communication device, a total computing resource of the first communication device, an available computing resource of the first communication device, remaining power of the first communication device, or storage space of the first communication device.

Optionally, the access network device or the core network device determines the second indication information based on the second information and third information, and sends the second indication information to the first communication device. The third information includes a bit rate identifier of the third background content.

Optionally, the third information further includes a tile identifier of the third background content.

In the method shown in FIG. 4, the method further includes the following steps.

S406: The first communication device determines the second background content based on the second indication information.

Specifically, after the first communication device receives the second indication information from the second communication device, the first communication device decodes the third background content based on the second indication information, to obtain the second background content.

S407: The terminal device receives first information, where the first information includes the second foreground content and the second background content.

Accordingly, the first communication device sends the first information to the terminal device.

Specifically, the first communication device renders the first foreground content based on the first indication information to obtain the second foreground content, the first communication device decodes the third background based on the second indication information of the second communication device to obtain the second background content, and the first communication device sends the second foreground content and the second background content to the terminal device as the first information.

S408: The terminal device combines the second background content and the second foreground content based on the first information for display.

Specifically, for synthesis of final display content of the terminal device, after the first communication device completes a task of rendering the first foreground content and/or decoding encoded background content, the first communication device transmits a data flow to the terminal device, and then the terminal device performs synthesis to obtain a final video and presents the final video on the terminal device.

Steps S401, S402, S403, S406, S407, and S408 in FIG. 4 are similar to steps S301, S302, S303, S306, S307, and S308 shown in FIG. 3. For details, refer to the detailed descriptions in FIG. 3. Details are not described herein again.

According to the solution shown in FIG. 4, a possible implementation in which the second communication device receives, when the second communication device is separately the access network device, the core network device, or the cloud server, the user interaction information of the terminal device and determines the third background content based on the user interaction information is described in detail. The access network device and the core network device may establish the local cache, locally cache the background content of the different rate versions, and establish the corresponding data mapping table. After receiving the user interaction information, the core network device and the access network device first query whether the corresponding background content is cached locally. If the corresponding background content is cached locally, the third background content is determined directly based on the locally cached background content; and if the corresponding background content is not cached locally, the user interaction information continues to be transmitted. According to the method shown in FIG. 4 in this application, when the terminal device has a large quantity of requests, content with high popularity is cached in the core network device or the access network device, further facilitating reduction in latency of end-to-end data transmission and improving user experience.

The foregoing mainly describes the solution in this embodiment of this application from a perspective of interaction between devices. It may be understood that, to implement the foregoing functions, devices, for example, the first communication device and the second communication device, each includes at least one of a corresponding hardware structure and a corresponding software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the first communication device and the second communication device may be divided into functional units based on the foregoing method examples. For example, each functional unit may be obtained through division based on each corresponding function, or two or more functions may be integrated into one processing unit. The integrated unit may be implemented in the form of hardware, or may be implemented in the form of a software functional unit. It should be noted that, in this embodiment of this application, division into the units is an example, and is merely a logical function division. In actual implementation, another division manner may be used.

The foregoing describes in detail the communication method provided in embodiments of this application with reference to FIG. 1 to FIG. 4. The following describes in detail a communication apparatus provided in embodiments of this application with reference to FIG. 5 and FIG. 6.

Figure 5:
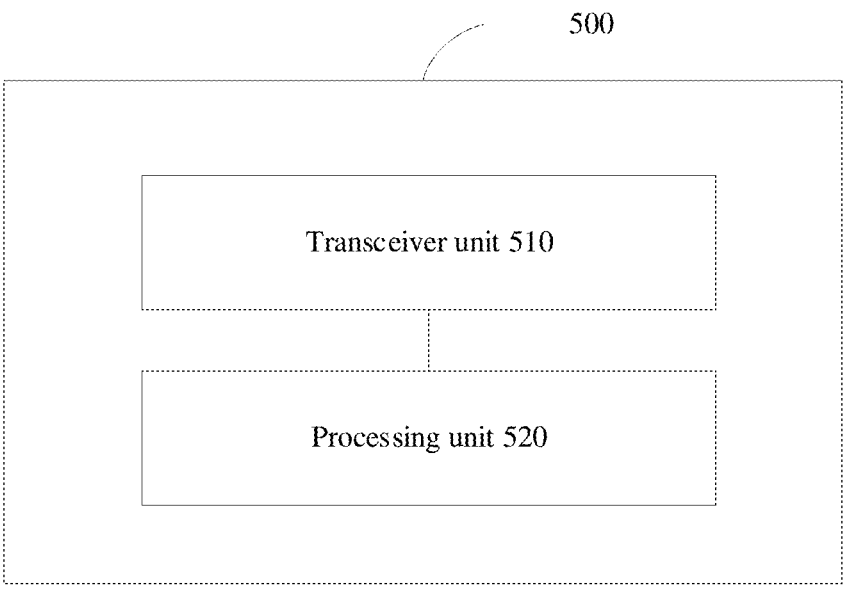
FIG. 5 is a block diagram of a communication apparatus according to this application.
Figure 6:
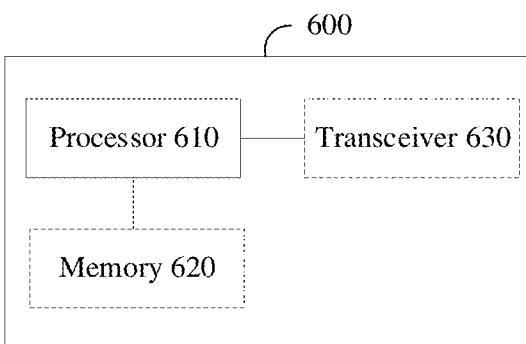
FIG. 6 is a block diagram of another communication apparatus according to this application.

FIG. 5 and FIG. 6 below describe in detail a communication apparatus provided in embodiments of this application. It should be understood that descriptions of apparatus embodiments correspond to the descriptions of the method embodiments. Therefore, for content that is not described in detail, refer to the foregoing method embodiments. For brevity, some content is not described again.

FIG. 5 is a block diagram of a communication apparatus according to an embodiment of this application. The apparatus 500 includes a transceiver unit 510 and a processing unit 520. The transceiver unit 510 may be configured to implement a corresponding communication function. The transceiver unit 510 may also be referred to as a communication interface or a communication unit. The processing unit 520 may be configured to implement a corresponding processing function, for example, modifying an address.

Optionally, the apparatus 500 further includes a storage unit. The storage unit may be configured to store instructions and/or data. The processing unit 520 may read the instructions and/or the data in the storage unit, to enable the apparatus to implement actions of a device or a network element in the foregoing method embodiments.

In a first design, the apparatus 500 may be the terminal device in the foregoing embodiments, or may be a constituent component (for example, a chip) of the terminal device. The apparatus 500 may implement steps or procedures performed by the terminal device in the foregoing method embodiments. The transceiver unit 510 may be configured to perform receiving and sending-related operations of the terminal device in the foregoing method embodiments. The processing unit 520 may be configured to perform processing-related operations of the terminal device in the foregoing method embodiments.

In a possible implementation, the transceiver unit 510 is configured to send first indication information to a first communication device. The first indication information indicates the first communication device to render first foreground content. The first foreground content is to-be-displayed foreground content of the terminal device. The transceiver unit 510 is further configured to receive first information from the first communication device. The first information includes second foreground content and second background content. The second foreground content is obtained by rendering the first foreground content. The second background content is obtained by decoding third background content. The third background content is determined based on first background content. The first background content is to-be-displayed background content of the terminal device.

Optionally, the transceiver unit 510 is further configured to send user interaction information to a second communication device, where the user interaction information is used for determining the first background content.

Optionally, the third background content is obtained by rendering and encoding the first background content by the second communication device.

Optionally, the third background content is obtained by the second communication device from locally cached background content based on the first background content.

Optionally, the processing unit 520 is configured to determine the first indication information based on the user interaction information and second information. The second information indicates a status of the first communication device.

Optionally, the second information includes one or more of the following: a channel state of the first communication device, a total computing resource of the first communication device, an available computing resource of the first communication device, remaining power of the first communication device, or storage space of the first communication device.

Optionally, the user interaction information includes one or more of the following: a user pose change, a user position change, or a user control instruction.

In a second design, the apparatus 500 may be the first communication device in the foregoing embodiment, or may be a constituent component (for example, a chip) of the first communication device. The apparatus 500 may implement steps or procedures performed by the first communication device in the foregoing method embodiment. The transceiver unit 510 is configured to perform receiving and sending-related operations of the first communication device in the foregoing method embodiment. The processing unit 520 is configured to perform processing-related operations of the first communication device in the foregoing method embodiment.

In a possible implementation, the transceiver unit 510 is configured to receive first indication information from a terminal device. The first indication information indicates the first communication device to render first foreground content. The first foreground content is to-be-displayed foreground content of the terminal device.

The transceiver unit 510 is further configured to receive second indication information from a second communication device. The second indication information indicates the first communication device to decode third background content. The third background content is determined based on first background content. The first background content is to-be-displayed background content of the terminal device.

The transceiver unit 510 is further configured to send first information to the terminal device. The first information includes second foreground content and second background content. The second foreground content is obtained by rendering the first foreground content. The second background content is obtained by decoding the third background content.

Optionally, the third background content is obtained by rendering and encoding the first background content by the second communication device.

Optionally, the third background content is obtained by the second communication device from locally cached background content based on the first background content.

Optionally, the transceiver unit 510 is further configured to send second information. The second information indicates a status of the first communication device.

Optionally, the second information includes one or more of the following: a channel state of the first communication device, a total computing resource of the first communication device, a computable resource of the first communication device, remaining power of the first communication device, or storage space of the first communication device.

In a third design, the apparatus 500 may be the second communication device in the foregoing embodiment, or may be a constituent component (for example, a chip) of the second communication device. The apparatus 500 may implement steps or procedures performed by the second communication device in the foregoing method embodiment. The transceiver unit 510 is configured to perform receiving and sending-related operations of the second communication device in the foregoing method embodiment. The processing unit 520 is configured to perform processing-related operations of the second communication device in the foregoing method embodiment.

In a possible implementation, the transceiver unit 510 is configured to receive user interaction information from a terminal device. The user interaction information is used for determining first background content. The first background content is to-be-displayed background content of the terminal device.

The transceiver unit 510 is further configured to send second indication information to a first communication device. The second indication information indicates the first communication device to decode third background content. The third background content is determined by the second communication device based on the first background content.

Optionally, the third background content is obtained by rendering and encoding the first background content by the second communication device.

Optionally, the third background content is obtained by the second communication device from locally cached background content based on the first background content.

Optionally, the processing unit 520 is further configured to send the second indication information to the first communication device based on second information. The second information indicates a status of the first communication device.

Optionally, the second information includes one or more of the following: a channel state of the first communication device, a total computing resource of the first communication device, an available computing resource of the first communication device, remaining power of the first communication device, or storage space of the first communication device.

Optionally, the processing unit 520 is further configured to determine the second indication information based on the second information and third information. The third information includes a bit rate identifier of the third background content.

Optionally, the third information further includes a tile identifier of the third background content.

Optionally, the user interaction information includes one or more of the following: a pose change of a user of the terminal device, a position change of a user of the terminal device, or a control instruction of a user of the terminal device.

It should be understood that, a specific process in which each unit performs the foregoing corresponding steps has been described in detail in the foregoing method embodiments. For brevity, details are not described herein again.

It should be understood that the apparatus 500 herein is embodied in a form of functional unit. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 500 may be specifically the terminal device in the foregoing embodiments, and may be configured to perform procedures and/or steps performed by the terminal device in the foregoing method embodiments; or the apparatus 500 may be specifically the first communication device in the foregoing embodiments, and may be configured to perform procedures and/or steps performed by the first communication device in the foregoing method embodiments; or the apparatus 500 may be specifically the second communication device in the foregoing embodiments, and may be configured to perform procedures and/or steps performed by the second communication device in the foregoing method embodiments. To avoid repetition, details are not described herein again.

The apparatus 500 in each of the foregoing solutions has functions of implementing corresponding steps performed by the terminal device, the first communication device, or the second communication device in the foregoing method. The functions may be implemented by using hardware, or may be implemented by using hardware executing corresponding software. The hardware or the software includes one or more modules corresponding to the foregoing functions. For example, the transceiver unit may be replaced by a transceiver (for example, a sending unit in the transceiver unit may be replaced by a transmitter, and a receiving unit in the transceiver unit may be replaced by a receiver), and another unit, for example, the processing unit, may be replaced by a processor, to separately perform a sending and receiving operation and a related processing operation in the method embodiments.

In addition, the transceiver unit 510 may alternatively be a transceiver circuit (which, for example, may include a receiving circuit and a sending circuit), and the processing unit may be a processing circuit.

It should be noted that the apparatus in FIG. 5 may be the network element or the device in the foregoing embodiments, or may be a chip or a chip system, for example, a system-on-chip (SoC). The transceiver unit may be an input/output circuit or a communication interface. The processing unit is a processor, a microprocessor, or an integrated circuit integrated on the chip. This is not limited herein.

FIG. 6 is a block diagram of another communication apparatus according to an embodiment of this application. The apparatus 600 includes a processor 610. The processor 610 is configured to execute a computer program or instructions stored in a memory 620, or read data/signaling stored in the memory 620, to perform the method in the foregoing method embodiments. Optionally, there are one or more processors 610.

Optionally, as shown in FIG. 6, the apparatus 600 further includes the memory 620. The memory 620 is configured to store the computer program or the instructions and/or the data. The memory 620 may be integrated with the processor 610, or may be disposed separately. Optionally, there are one or more memories 620.

Optionally, as shown in FIG. 6, the apparatus 600 further includes a transceiver 630. The transceiver 630 is configured to receive and/or send a signal. For example, the processor 610 is configured to control the transceiver 630 to receive and/or send a signal.

In a solution, the apparatus 600 is configured to implement operations performed by each device in the foregoing method embodiments.

For example, the processor 610 is configured to execute the computer program or the instructions stored in the memory 620, to implement related operations of the terminal device in the foregoing method embodiments, for example, the operations performed by the terminal device in any implementation method in FIG. 3.

It should be understood that, the processor mentioned in embodiments of this application may be a central processing unit (CPU), and may alternatively be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in this embodiment of this application may be a volatile memory and/or a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM). For example, the RAM may be used as an external cache. By way of example, and not limitation, the RAM includes a plurality of forms, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) may be integrated into the processor.

It should further be noted that the memory described herein is intended to include, but is not limited to, these and any other appropriate type of memory.

An embodiment of this application further provides a computer-readable storage medium. The computer-readable storage medium stores computer instructions for implementing the method performed by the network element in the foregoing method embodiments.

For example, when a computer program is executed by a computer, the computer is enabled to implement the method performed by the terminal device in the foregoing method embodiments.

For another example, when a computer program is executed by a computer, the computer is enabled to implement the method performed by the first communication device in the foregoing method embodiments.

For another example, when a computer program is executed by a computer, the computer is enabled to implement the method performed by the second communication device in the foregoing method embodiments.

An embodiment of this application further provides a computer program product, including instructions. When the instructions are executed by a computer, the method performed by the terminal device or the communication device in the foregoing method embodiments is implemented.

An embodiment of this application further provides a communication system, including one or more of the foregoing terminal device, first communication device, and second communication device.

For explanations and beneficial effects of related content in any one of the apparatuses provided above, refer to the corresponding method embodiment provided above. Details are not described herein again.

In embodiments provided in this application, it should be understood that the disclosed apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When computer program instructions are loaded and executed on a computer, the procedure or functions according to embodiments of this application are all or partially generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. For example, the usable medium may include but is not limited to any medium that can store program code, for example, a USB flash drive, a removable hard disk, a read-only memory (ROM), a random access memory (RAM), a magnetic disk, or an optical disc.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. A computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communication method, comprising:

sending, by a terminal device, first indication information to a first communication device, wherein the first indication information indicates the first communication device to render first foreground content, and the first foreground content is to-be-displayed foreground content of the terminal device; and receiving, by the terminal device, first information from the first communication device, wherein the first information comprises second foreground content and second background content, wherein the second foreground content is obtained by rendering the first foreground content, the second background content is obtained by decoding third background content, the third background content is determined based on first background content, and the first background content is to-be-displayed background content of the terminal device.

2. The communication method according to claim 1, further comprising:

sending, by the terminal device, user interaction information to a second communication device, wherein the user interaction information is used for determining the first background content.

3. The communication method according to claim 1, wherein the third background content is obtained by rendering and encoding the first background content by the second communication device.

4. The communication method according to claim 1, wherein the third background content is obtained by the second communication device from locally cached background content based on the first background content.

5. The communication method according to claim 2, further comprising:

determining, by the terminal device, the first indication information based on the user interaction information and second information, wherein the second information indicates a status of the first communication device, and the second information comprises one or more of a channel state of the first communication device, a total computing resource of the first communication device, an available computing resource of the first communication device, remaining power of the first communication device, or storage space of the first communication device.

6. The communication method according to claim 2, wherein the user interaction information comprises one or more of a pose change of a user of the terminal device, a position change of a user of the terminal device, or a control instruction of a user of the terminal device.

7. A communication apparatus, comprising:

at least one processor; and a memory coupled to the at least one processor having instructions stored thereon that, when executed by the at least one processor, cause the communication apparatus to:

send first indication information to a first communication device, wherein the first indication information indicates the first communication device to render first foreground content, and the first foreground content is to-be-displayed foreground content of the communication apparatus; and receive first information from the first communication device, wherein the first information comprises second foreground content and second background content, wherein the second foreground content is obtained by rendering the first foreground content, the second background content is obtained by decoding third background content, the third background content is determined based on first background content, and the first background content is to-be-displayed background content of the apparatus.

8. The communication apparatus according to claim 7, wherein the communication apparatus is further caused to:

send user interaction information to a second communication device, wherein the user interaction information is used for determining the first background content.

9. The communication apparatus according to claim 7, wherein the third background content is obtained by rendering and encoding the first background content by the second communication device.

10. The communication apparatus according to claim 7, wherein the third background content is obtained by the second communication device from locally cached background content based on the first background content.

11. The communication apparatus according to claim 8, wherein the communication apparatus is further caused to:

determine the first indication information based on the user interaction information and second information, wherein the second information indicates a status of the first communication device, and the second information comprises one or more of a channel state of the first communication device, a total computing resource of the first communication device, an available computing resource of the first communication device, remaining power of the first communication device, or storage space of the first communication device.

12. The communication apparatus according to claim 8, wherein the user interaction information comprises one or more of a pose change of a user of the communication apparatus, a position change of a user of the communication apparatus, or a control instruction of a user of the communication apparatus.

13. A communication apparatus, wherein the apparatus comprises:

at least one processor; and a memory coupled to the at least one processor having instructions stored thereon that, when executed by the at least one processor, cause the communication apparatus to:

receive first indication information from a terminal device, wherein the first indication information indicates the apparatus to render first foreground content, and the first foreground content is to-be-displayed foreground content of the terminal device;

receive second indication information from a second communication device, wherein the second indication information indicates the apparatus to decode third background content, the third background content is determined based on first background content, and the first background content is to-be-displayed background content of the terminal device; and send first information to the terminal device, wherein the first information comprises second foreground content and second background content, wherein the second foreground content is obtained by rendering the first foreground content, and the second background content is obtained by decoding the third background content.

14. The communication apparatus according to claim 13, wherein the third background content is obtained by rendering and encoding the first background content by the second communication device.

15. The communication apparatus according to claim 13, wherein the third background content is obtained by the second communication device from locally cached background content based on the first background content.

16. The communication apparatus according to claim 13, wherein the communication apparatus is further caused to:

send second information, wherein the second information indicates a status of the apparatus, and the second information comprises one or more of a channel state of the communication apparatus, a total computing resource of the communication apparatus, a computable resource of the communication apparatus, remaining power of the communication apparatus, or storage space of the communication apparatus.

17. The communication apparatus according to claim 13, wherein the communication apparatus is further caused to:

send second information, wherein the second information indicates a status of the apparatus.

18. The communication apparatus according to claim 13, wherein the second information comprises a channel state of the communication apparatus, a total computing resource of the communication apparatus, and a remaining power of the communication apparatus.

19. The communication method according to claim 2, further comprising:

determining, by the terminal device, the first indication information based on the user interaction information and second information, wherein the second information indicates a status of the first communication device.

20. The communication apparatus according to claim 8, wherein the communication apparatus is further caused to:

determine the first indication information based on the user interaction information and second information, wherein the second information indicates a status of the first communication device.

\* \* \* \* \*